United States Patent [19]

Yamamoto et al.

[11] Patent Number: 4,515,917
[45] Date of Patent: May 7, 1985

[54] ADHESIVE COMPOSITION

[75] Inventors: Kazuhito Yamamoto; Toshio Takenaka, both of Osaka, Japan

[73] Assignee: Sumitomo Chemical Company, Limited, Osaka, Japan

[21] Appl. No.: 528,659

[22] Filed: Sep. 1, 1983

[51] Int. Cl.³ ............................................... C08K 5/57
[52] U.S. Cl. ................................................... 524/178
[58] Field of Search ................ 524/178; 525/309, 112, 525/116, 248; 523/435

[56] References Cited

U.S. PATENT DOCUMENTS

| | | | |
|---|---|---|---|
| 3,890,407 | 6/1975 | Briggs et al. | 525/301 |
| 3,934,056 | 1/1976 | Yoshida et al. | 524/178 |
| 3,962,372 | 6/1976 | Arhart | 525/301 |

OTHER PUBLICATIONS

The Stabilization of Polyvinyl Chloride by F. Chevassus et al., (1963), p. 165.

Primary Examiner—Veronica P. Hoke
Attorney, Agent, or Firm—Birch, Stewart, Kolasch & Birch

[57] ABSTRACT

An adhesive composition enhanced in storage stability which consists essentially of a main component and an activating component, the main component comprising (A) at least one of acrylic and methacrylic monomers, (B) chlorosulfonated polyethylene or a mixture of chlorinated polyethylene and a sulfonyl chloride, (C) an organic peroxide, (D) a phenolic stabilizer and (E) an organic tin compound, optionally with (F) an epoxy resin.

5 Claims, No Drawings

ADHESIVE COMPOSITION

BACKGROUND OF THE INVENTION

The present invention relates to an improved adhesive composition. More particularly, it relates to a two component type adhesive composition of which the main component of the composition enhances storage stability.

There are known a variety of reactive type adhesive compositions which do not substantially contain any solvent and are cured by the polymerization of the monomeric component therein to achieve a firm adhesion of the various materials. One example is a two component type adhesive composition which essentially consists of a main or first component comprising a polymerizable monomer, such as an acrylic or methacrylic monomer, and a free radical producing agent, such as an organic peroxide, and an activating or second component composition comprising an activator which initiates the polymerization of the polymerizable monomer at room temperature. As the activator, there is preferably employed one which can assure the production of sufficient adhesion strength to the polymerized monomer even when used in a small amount.

An adhesive composition is generally required to exhibit an excellent performance in adhesion rate and adhesion strength. It is simultaneously important that these properties are maintained over a long period of time. Quite often, the main component in a two component type adhesive composition produces gelation or deterioration of performance within a relatively short period of time.

U.S. Pat. No. 3,890,407 discloses a two component type adhesive composition of which the main component comprises a solution of chlorosulfonated polyethylene or a mixture of chlorinated polyethylene with a sulfonyl chloride, in an acrylic or methacrylic monomer and an organic peroxide. This adhesive composition is excellent in adhesion strength but insufficient in storage stability.

U.S. Pat. No. 3,962,372 proposes the improvement of the storage stability of the adhesive composition disclosed in U.S. Pat. No. 3,890,407. Namely, it proposes the incorporation of 2,6-di-t-butyl-4-methylphenol (BHT) as a stabilizer with the main component in an amount of 1 to 4 parts by weight to 1 part by weight of a hydroperoxide as the radical producing agent therein. It could be experimentally confirmed that the above proposal improves the stability. However, it was simultaneously ascertained that in the test of accelerated storage stability, gelation takes place at 50° C. within 7 to 10 days. For practical use, such gelation should not take place for at least 20 to 30 days. Thus, the improved adhesive composition proposed is still not satisfactory in this respect.

SUMMARY OF THE INVENTION

As a result of extensive research, it has now been found that the additional incorporation of an organic tin compound into the main component of the adhesive composition is extremely effective in improving the storage stability. It has also been found that the improved effect is further enhanced by the additional incorporation of an epoxy resin therein.

Accordingly, a main object of the present invention is to provide a two component type adhesive composition having a high storage stability, without producing any gelation over a long period of time, and without the deterioration of its performance as to adhesion rate and adhesion strength.

DETAILED DISCUSSION

The two component type adhesive composition of the present invention essentially consists of a main component and an activating component, the main component comprising (A) at least one of acrylic and methacrylic monomers, (B) at least one of a chlorosulfonated polyethylene and a mixture of chlorinated polyethylene with a sulfonyl chloride, (C) an organic peroxide, (D) a stabilizer and (E) an organic tin compound, optionally with (F) an epoxy resin.

Examples of the acrylic and methacrylic monomers to be used as the component (A) are alkyl acrylates and methacrylates (e.g. methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate), cycloalkyl acrylates and methacrylates (e.g. cyclohexyl acrylate, cyclohexyl methacrylate), alkoxyalkyl acrylates and methacrylates (e.g. methoxyethyl acrylate, methoxyethyl methacrylate, ethoxyethyl acrylate, ethoxyethyl methacrylate, butoxyethyl acrylate, butoxyethyl methacrylate), heterocyclic alkyl acrylates and methacrylates (e.g. tetrahydrofurfuryl acrylate, tetrahydrofurfuryl methacrylate), ethylene glycol dimethacrylate, trimethylolpropane trimethacrylate, and like materials. These acrylic and methacrylic monomers may be used alone or in combination.

Chlorosulfonated polyethylene or a mixture of chlorinated polyethylene with a sulfonyl chloride usable as the component (B) contains about 25 to 75% by weight of chlorine and about 3 to 160 mmoles of a sulfonyl chloride moiety per 100 grams of the polymer, and the polyethylene from which the chlorosulfonated or chlorinated polyethylene is prepared has a melt index of about 4 to 500. The chlorosulfonated polyethylene may be prepared in a manner known to those skilled in the art, for example, in the manner as described in the aforesaid U.S. Pat. No. 3,890,407. The chlorosulfonated polyethylene is also available commercially. Examples of the sulfonyl chloride are toluenesulfonyl chloride, diphenyl ether-4,4'-disulfonyl chloride, and the like.

The organic peroxide as the component (C) is a free radical producing agent. Examples of the organic peroxide are benzoyl peroxide, t-butyl hydroperoxide, cumene hydroperoxide, and the like.

The stabilizer used as the component (D) for the improvement of the storage life may be, for instance, hydroquinone, hydroquinone monomethyl ether, 2,6-di-t-butyl-4-methylphenol (BHT), and the like. Among them, BHT is the most preferred.

The organic tin compound as the component (E) includes di or tri($C_1$–$C_{18}$)alkyl or benzyl tin mono or di-aliphatic saturated or unsaturated carboxylates. Their specific examples are dibutyl tin maleate, di-n-octyl tin maleate, dibutyl tin distearate, dibutyl tin dinonylate, dibutyl tin dilaurate, tribenzyl tin laurate, and the like.

In addition to the above essential components, the main component may include optionally an epoxy resin as the component (F) so that the stability will be further enhanced. However, the sole use of the epoxy resin in the absence of the organic tin compound does not produce an improved effect. As the epoxy resin, there may be used any commercially available resin. Specific examples are polyglycidyl ethers, polyglycidyl esters, and the like. The epoxy resins commercially available under the tradenames "Epikote 815" and "Epikote 828" (manufactured by Shell) are usable. They may be in a liquid form or a solid form.

In the main component, the acrylic or methacrylic monomer(s) may be included in an amount of 40 to 70% by weight, preferably 55 to 70% by weight on the basis of the weight of the main component of the adhesive composition. The weight proportion of the chlorosulfonated polyethylene or the chlorinated polyethylene and the acrylic or methacrylic monomer(s) may be usually from 100:50–200, preferably from 100:100–200. When the chlorinated polyethylene is used, the amount of the sulfonyl chloride may be not less than an equimolar amount to the chlorinated polyethylene. The organic peroxide is normally included in an amount of 0.01 to 10% by weight, preferably of 0.05 to 5% by weight, based on the weight of the main component. The stabilizer is ordinarily contained in amount of 0.01 to 10% by weight, preferably 0.05 to 5% by weight. The amount of the organic tin compound may be usually from 0.01 to 10% by weight, preferably from 0.05 to 5% by weight. A higher amount is not desired because the adhesion strength is lowered. A smaller amount can not produce a material stabilization effect. The amount of the epoxy resin is normally from 0.01 to 10% by weight, preferably from 0.05 to 5% by weight.

The essential components and, if used, optional components with or without other conventional additives are mixed together by conventional mixing procedure(s) to give the main component of the composition.

The activating component of the composition comprises (a) an activator, of which specific examples are tertiary amines (e.g. N,N'-dimethylaniline, N,N'-diisopropyl-p-toluidine), the condensates of an aldehyde with a primary or secondary amine (e.g. the condensate of butyraldehyde with aniline or butylamine), and the like. Activators known under the tradenames "Activator 808" and "Activator 833" (manufactured by DuPont) are also usable.

In addition to the activator, the activating component may comprise optionally (b) an accelerator for increasing the curing rate. Examples of the accelerator include oxidative compounds of transition metals, such as copper naphthenate, cobalt naphthenate, iron naphthenate, nickel naphthenate, complexes of acetylacetone with iron, copper, cobalt or vanadium, and the like.

The amount of the activator in the activating component of the composition may be from 10 to 100% by weight, preferably from 20 to 100% by weight, based on the weight of the activating component of the composition. The accelerator may be used in an amount of 0 to 10% by weight, preferably of 0 to 5% by weight.

No particular limitations are placed on the weight proportions of the main component and the activator component of the resulting composition. In general, the latter is used in an amount of 5 to 50 parts by weight, preferably 10 to 30 parts by weight to 100 parts by weight of the former.

The resultant adhesive composition may be applied for the firm adhesion of various materials in a conventional manner. For example, the activating component is first applied to one or both surfaces of materials to be joined, and then the main component is applied to at least one of the surfaces. Examples of materials to be joined are metals, plastics, ceramics, woods, and the like.

Practical and presently preferred embodiments of the present invention are illustratively represented in the following examples wherein part(s) and % are by weight unless otherwise indicated. In the examples, "Activator 808" was used as the activator. The accelerated storage stability test was carried out in the following manner:

The main component composition (50 g) was charged in a 60 ml volume glass bottle, the bottle was sealed with a stopper and the sealed bottle was allowed to stand in a desiccator at 50° C. for a pre-determined period of time. The content was sampled every week. By the use of the sampled main component and the activator, two steel plates were bonded, and the tensile shear strength ($kg/cm^2$) was determined after curing for 5 minutes and after curing for 24 hours.

PREFERRED EMBODIMENTS

Examples 1–9 and Comparative Examples 1–2

Methyl methacrylate (50 parts), 2-ethylhexyl methacrylate (10 parts), ethylene glycol dimethacrylate (2 parts), trimethylolpropane trimethacrylate (1 part) and methacrylic acid (7 parts) were mixed together. To the resultant mixture (70 parts), chlorosulfonated polyethylene or a mixture of chlorinated polyethylene and a sulfonyl chloride, an organic peroxide, 2,6-di-t-butyl-4-methylphenol (BHT) and an organic tin compound and "Epikote 828" were added, and the resulting mixture was mixed uniformly to make a main component composition.

The storage stability test was carried out on the main component composition, and the results (i.e. the tensile shear strength) are shown in Table 1. When gelation was produced in the main component during the storage, the tensile shear strength was not determined.

TABLE 1

| | Example | | | | | | | | | Comparative Example | |
|---|---|---|---|---|---|---|---|---|---|---|---|
| | 1 | 2 | 3 | 4 | 5 | 6 | 7 | 8 | 9 | 1 | 2 |
| Chlorosulfonated polyethylene[+] | 35 | 35 | 40 | 45 | — | — | 40 | 40 | 40 | 35 | 35 |
| Chlorinated polyethylene + sulfonyl chloride mixture[2] | — | — | — | — | 35 | 45 | — | — | — | — | — |
| Cumene hydroperoxide | 1 | 1 | 1 | 1 | — | — | 0.5 | 0.5 | 2 | 1 | 1 |
| t-Butyl hydroperoxide | — | — | — | — | 1 | 0.5 | — | — | — | — | — |
| BHT | 0.8 | 0.8 | 0.8 | 0.8 | 0.8 | 0.8 | 0.4 | 0.4 | 1.5 | 0.8 | 0.8 |
| Dibutyl tin maleate | 1 | 1 | 1 | 1 | 1 | 0.5 | — | — | 1.5 | — | — |
| Dibutyl tin stearate | — | — | — | — | — | — | 0.5 | — | — | — | — |
| Dibutyl tin dilaurate | — | — | — | — | — | — | — | 0.5 | — | — | — |
| Epikote 828 | — | 2 | — | — | — | — | — | — | — | — | 2 |
| Initial After 5 minutes | 38 | 32 | 40 | 50 | 30 | 31 | 40 | 32 | 59 | 35 | 33 |
| After 24 hours | 265 | 249 | 272 | 301 | 231 | 229 | 245 | 240 | 288 | 258 | 245 |

TABLE 1-continued

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| 50° C., 1W | After 5 minutes | 29 | 33 | 45 | 51 | 32 | 29 | 38 | 30 | 53 | 0 | 5 |
| | After 24 hours | 230 | 245 | 280 | 310 | 215 | 201 | 225 | 233 | 290 | 120 | 132 |
| 50° C., 2W | After 5 minutes | 20 | 29 | 33 | 47 | 18 | 15 | 28 | 24 | 52 | 8th Day Gelation | 9th Day Gelation |
| | After 24 hours | 190 | 210 | 240 | 256 | 180 | 176 | 205 | 200 | 279 | | |
| 50° C., 3W | After 5 minutes | 10 | 19 | 20 | 40 | 8 | 7 | 12 | 10 | 40 | — | — |
| | After 24 hours | 155 | 195 | 190 | 210 | 120 | 115 | 138 | 120 | 195 | — | — |
| 50° C., 4W | After 5 minutes | 5 | 15 | 10 | 25th Day Gelation | 3 | 3 | 5 | 3 | 22nd Day Gelation | — | — |
| | After 24 hours | 120 | 186 | 133 | | 50 | 55 | 90 | 75 | | — | — |

Note:
[1] Chlorosulfonated polyethylene having a chlorine content of 29% and a sulfur content of 1.4% and a Mooney viscosity of 30 was used.
[2] A mixture of chlorinated polyethylene having a chlorine content of 44% and prepared from polyethylene having a melt index of 150 and diphenyl ether-4,4'-disulfonyl chloride in a weight ratio of 10:1 was used.

From the above results, it is understood that the addition of an organic tin compound is effective in enhancement of the storage stability.

Examples 10–11 and Comparative Examples 3–4

Butyl methacrylate (20 parts), tetrahydrofurfuryl methacrylate (20 parts), ethoxyethyl methacrylate (20 parts), ethylene glycol dimethacrylate (2 parts), trimethylolpropane trimethacrylate (1 part), methacrylic acid (7 parts), chlorosulfonated polyethylene (40 parts), cumene hydroperoxide (1 part) and BHT (1.5 parts) were mixed together. To the resultant mixture, dibutyl tin maleate and "Epikote 828" were added to make a main component composition. The main component composition was subjected to test for accelerated storage stability. The results are shown in Table 2.

TABLE 2

| | | Example | | Comparative Example | |
|---|---|---|---|---|---|
| | | 10 | 11 | 3 | 4 |
| Dibutyl tin maleate | | 1 | 1 | — | — |
| Epikote 828 | | — | 2 | — | 2 |
| Initial | After 5 minutes | 90 | 89 | 75 | 77 |
| | After 24 hours | 232 | 215 | 220 | 215 |
| 50° C., 1W | After 5 minutes | 82 | 90 | 10 | 25 |
| | After 24 hours | 212 | 230 | 135 | 155 |
| 50° C., 2W | After 5 minutes | 70 | 78 | 9th Day | 10th Day |
| | After 24 hours | 203 | 210 | Gelation | Gelation |
| 50° C., 3W | After 5 minutes | 60 | 75 | — | — |
| | After 24 hours | 190 | 195 | — | — |
| 50° C., 4W | After 5 minutes | 15 | 70 | — | — |
| | After 24 hours | 110 | 180 | — | — |

Examples 12–16 and Comparative Example 5

Methyl methacrylate (20 parts), 2-ethylhexyl methacrylate (10 parts), tetrahydrofurfuryl methacrylate (30 parts), ethylene glycol dimethacrylate (2 parts), trimethylolpropane trimethacrylate (1 part) and methacrylic acid (5 parts) were mixed together. To the resultant mixture (68 parts), chlorosulfonated polyethylene, cumene hydroperoxide, BHT, an organic tin compound and "Epikote 828" or "Epikote 815" were added to make a main component composition. The main component composition was subjected to test for accelerated storage stability. The results are shown in Table 3.

TABLE 3

| | | Example | | | | | Comparative Example |
|---|---|---|---|---|---|---|---|
| | | 12 | 13 | 14 | 15 | 16 | 5 |
| Chlorosulfonated polyethylene | | 40 | 40 | 40 | 40 | 40 | 40 |
| Cumene hydroperoxide | | 1 | 1 | 1 | 1 | 1 | 1 |
| BHT | | 1 | 1 | 1 | 1 | 1 | 1 |
| Dibutyl tin maleate | | 1 | — | — | 1 | 1 | — |
| Dibutyl tin stearate | | — | 1 | — | — | — | — |
| Dibutyl tin dilaurate | | — | — | 1 | — | — | — |
| Epikote 828 | | 2 | — | 2 | — | — | — |
| Epikote 815 | | — | 2 | — | 1 | 0.5 | — |
| Initial | After 5 minutes | 89 | 80 | 77 | 75 | 78 | 70 |
| | After 24 hours | 302 | 285 | 296 | 279 | 290 | 295 |
| 50° C., 1W | After 5 minutes | 88 | 79 | 72 | 70 | 81 | 60 |
| | After 24 hours | 290 | 270 | 283 | 288 | 278 | 205 |
| 50° C., 2W | After 5 minutes | 77 | 69 | 70 | 66 | 77 | 10th Day Gelation |
| | After 24 hours | 232 | 229 | 262 | 230 | 243 | |
| 50° C., 3W | After 5 minutes | 60 | 59 | 66 | 61 | 62 | — |
| | After 24 hours | 205 | 192 | 198 | 187 | 190 | — |
| 50° C., 4W | After 5 minutes | 45 | 40 | 38 | 45 | 32 | — |
| | After 24 hours | 125 | 138 | 115 | 122 | 109 | — |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adhesive composition which consists essentially of a main component and an activating component, said main component comprising (A) at least one of acrylic and methacrylic monomers, (B) chlorosulfonated polyethylene or a mixture of chlorinated polyethylene and a sulfonyl chloride, (C) an organic peroxide, (D) a stabilizer selected from at least one member of the group consisting of hydroquinone, hydroquinone monomethyl ether, and 2,6-di-t-butyl-4-methyl-phenol and (E) an organic tin compound selected from the group consisting of di and tri($C_1$-$C_{18}$)alkyl or benzyl tin mono- and di-aliphatic carboxylates.

2. The adhesive composition according to claim 1, of which the main component comprises at least one of said acrylic or methacrylic monomers in an amount of 40 to 70% by weight based on the weight of said main component, said chlorosulfonated polyethylene or mixture of said chlorinated polyethylene and sulfonyl chloride in an amount of 2 to ½ parts by weight to one part by weight of said acrylic or methacrylic monomers, said organic peroxide in an amount of 0.01 to 10% by weight, said stabilizer in an amount of 0.01 to 10% by weight and said organic tin compound in an amount of 0.01 to 10% by weight, all based on the weight of the main component.

3. The adhesive composition according to claim 1, wherein said main component further comprises an epoxy resin (F).

4. The adhesive composition according to claim 3, wherein said epoxy resin is present in an amount of from 0.01 to 10% by weight of said main component.

5. The adhesive composition according to claim 1, wherein said activating component comprises a activator inclusive of an accelerator for increasing the curing rate.

* * * * *